(12) United States Patent
Chang et al.

(10) Patent No.: US 6,397,383 B1
(45) Date of Patent: May 28, 2002

(54) CONSTRAINT LANGUAGE PARSER WHICH REJECTS INVALID FILTER CONSTRAINT DURING RUN TIME

(75) Inventors: David Yu Chang; Ajay Reddy Karkala; John Shih-Yuan Wang, all of Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/259,176

(22) Filed: Feb. 26, 1999

(51) Int. Cl.⁷ ................................................. G06F 9/45
(52) U.S. Cl. ........................ 717/142; 717/143; 707/3; 707/4; 707/6
(58) Field of Search ........................... 717/8, 7, 3, 141, 717/142, 143, 112; 707/3, 4, 6

(56) References Cited

U.S. PATENT DOCUMENTS

| | | | |
|---|---|---|---|
| 5,276,880 A | 1/1994 | Platoff et al. | |
| 5,475,588 A | 12/1995 | Schabes et al. | |
| 5,627,914 A | 5/1997 | Pagallo | |
| 6,182,067 B1 * | 1/2001 | Presnell et al. | 707/5 |

OTHER PUBLICATIONS

DIALOG Corporation, "Searching DIALOG: The Basics", Knight–Ridder Information Inc., pp. i–iv, 1.1–1.8, 2.1–2.10, 3.1–3.6, 4.1–4.4, A.1–A.6, 1.1, 1997.*

Klarlund et al., "Formal design constraints", ACM, pp. 370–383, Oct. 1996.*

McKenzie et al., "Error repair in shift–reduce parsers", ACM, pp. 672–689, Jul. 1995.*

Some et al., "Parsing minimization when extracting information from code in the presence of conditional compilation", IEEE, pp. 118–125, Jun. 1998.*

* cited by examiner

Primary Examiner—Kakali Chaki
Assistant Examiner—Ted T. Vo
(74) Attorney, Agent, or Firm—Sawyer Law Group LLP; David A. Mims, Jr.

(57) ABSTRACT

The present invention provides a system and method for parsing a constraint language in a computer network. The method includes receiving a constraint string; parsing the constraint string, comprising replacement of valid operators, variables, and values with special characters; and determining if the parsed constraint string indicates the existence of errors in the constraint string. The parser of the present invention is based upon an analysis of the constraint language from which patterns of the language are identified. The easily implemented parser of the present invention is developed based on these patterns. Because the method of the present invention replaces members of a finite set of valid operators, variables, and values, instead of attempting to identify an infinite number of possible errors, it is able to detect all invalid constraints.

2 Claims, 3 Drawing Sheets

CONSTRAINT LANGUAGE PARSER WHICH REJECTS INVALID FILTER CONSTRAINT DURING RUN TIME

FIELD OF THE INVENTION

The present invention relates generally to computer networks, and more particularly in notification services for such computer networks.

BACKGROUND OF THE INVENTION

Sometimes, users of a computer network wishes to receive certain types of information from their network. For example, a stockbroker may wish to be notified of the price of a particular stock when the price changes. One way for the network to provide this type of service is to use the Notification Service of COMPONENT BROKER, a Common Object Request Broker Architecture (CORBA)-based service developed by INTERNATIONAL BUSINESS MACHINES CORPORATION, which is an extension of Object Management Group (OMG) services. CORBA is a standard for distributed objects in a computer network and provides the mechanisms by which objects transparently make requests and receive responses. The OMG is a consortium of software vendors and end users. Many OMG member companies are developing commercial products that support these standards and/or are developing software that use this standard. Component Broker and CORBA are well known in the art and will not be discussed in detail here.

FIG. 1 illustrates a conventional computer network which may offer the Notification Service of Component Broker. The computer network 100 comprises a server 102 and a plurality of workstations 104. The server 102 contains the Component Broker software 106. Software applications 108, residing on the server 102 and/or the workstations 104, operate with the Component Broker 106. A user at a workstation 104 may inform the Component Broker 106 that he/she wishes to be notified when a certain event occurs, such as the change in price stock. The Component Broker 106 monitors events from the application 108. When an event occurs which matches the user's wish, the Component Broker 106 sends a message to the user with information concerning the event.

However, users typically do not wish to be inundated with all available information concerning a topic. For example, the stock broker may wish only to be notified when a particular company's stock price changes to below $100 per share and does not wish to be notified otherwise. The Component Broker 106 accommodates the user by allowing him/her to enter constraints in their requests for notification, using a constraint language. The constraints entered by the user is referred to as the "constraint string". For example, the stock broker may enter the following constraint string:

($company=='IBM') AND ($stockprice<100.00).

"$company" and "$stockprice" are variables, with "$company" referring to the name of the stock, and "$stockprice" referring to the stock's current price. "==", "AND", and "<" are operators. "IBM" is a character string which is surrounded by single quotes. The user's constraint string thus informs the Component Broker 106 that the user wishes to be notified of all events concerning IBM stock below a current price of $100. The constraint language of the Component Broker 106 is well known in the art and will not be discussed in further detail here.

When the user inputs a constraint string, the Component Broker 106 checks for syntax errors. Examples of errors include:

mismatched grouping operators: $a*($b+$c))

invalid mathematical operator: $a++1 invalid comparative functions: $a=1 unsupported Boolean connectives: ($a>1) xnor ($b>1)

"$" is missing for a variable: a>1

The conventional method of checking the constraint string for errors performs the checking when the Component Broker 106 first receives the constraint string from the user. If an error is found, then the constraint string is rejected immediately. If no errors are found, the Component Broker 106 accepts it as a valid constraint string and proceeds to process the notification request by monitoring events from the application 108. However, the error checking occurs on a case by case basis, i.e., the Component Broker 106 checks for known and predictable types of errors. Unfortunately, a constraint string could be invalid in an infinite number of ways. To detect every possible error in the constraint string is almost an impossible task since it is almost impossible to anticipate or predict all of the possible errors a user may make. Thus, errors are not always detected. If a constraint string with an error is not detected, the Component Broker accepts the constraint string as a valid constraint string, and the error is not detected until the Component broker 106 attempts to process the constraint string during run time. Only when the Component Broker 106 attempts to match an event with the constraint string, and cannot due to the error, will the Component Broker 106 detect the error. By the time the error is detected, a significant time period could have already passed from the time the constraint string was entered by the user. This time period could be hours, days, weeks, or even months. This wastes valuable time, and the requesting user will fail to receive the requested notifications.

Accordingly, what is needed is a system and method for providing a parser for a constraint language in a computer network. The parser should detect all invalid constraints and should be easy to implement. The present invention addresses such a need.

SUMMARY OF THE INVENTION

The present invention provides a system and method for parsing a constraint language in a computer network. The method includes receiving a constraint string; parsing the constraint string, comprising replacement of valid operators, variables, and values with special characters; and determining if the parsed constraint string indicates the existence of errors in the constraint string. The parser of the present invention is based upon an analysis of the constraint language from which patterns of the language are identified. The easily implemented parser of the present invention is developed based on these patterns. Because the method of the present invention replaces members of a finite set of valid operators, variables, and values, instead of attempting to identify an infinite number of possible errors, it is able to detect all invalid constraints.

DETAILED DESCRIPTION OF THE INVENTION

The present invention relates to a system and method for providing a parser for a constraint language in a computer network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The parser method of the present invention is based upon an analysis of the constraint language from which patterns of the language are identified. A simple parser is developed based on these patterns. Because the method of the present invention replaces members of a finite set of valid operators, variables, and values, instead of attempting to identify an infinite number of possible errors, it is able to detect all invalid constraints during run time.

To more particularly describe the features of the present invention, please refer to FIGS. 2 and 3 in conjunction with the discussion below.

Figure 1:
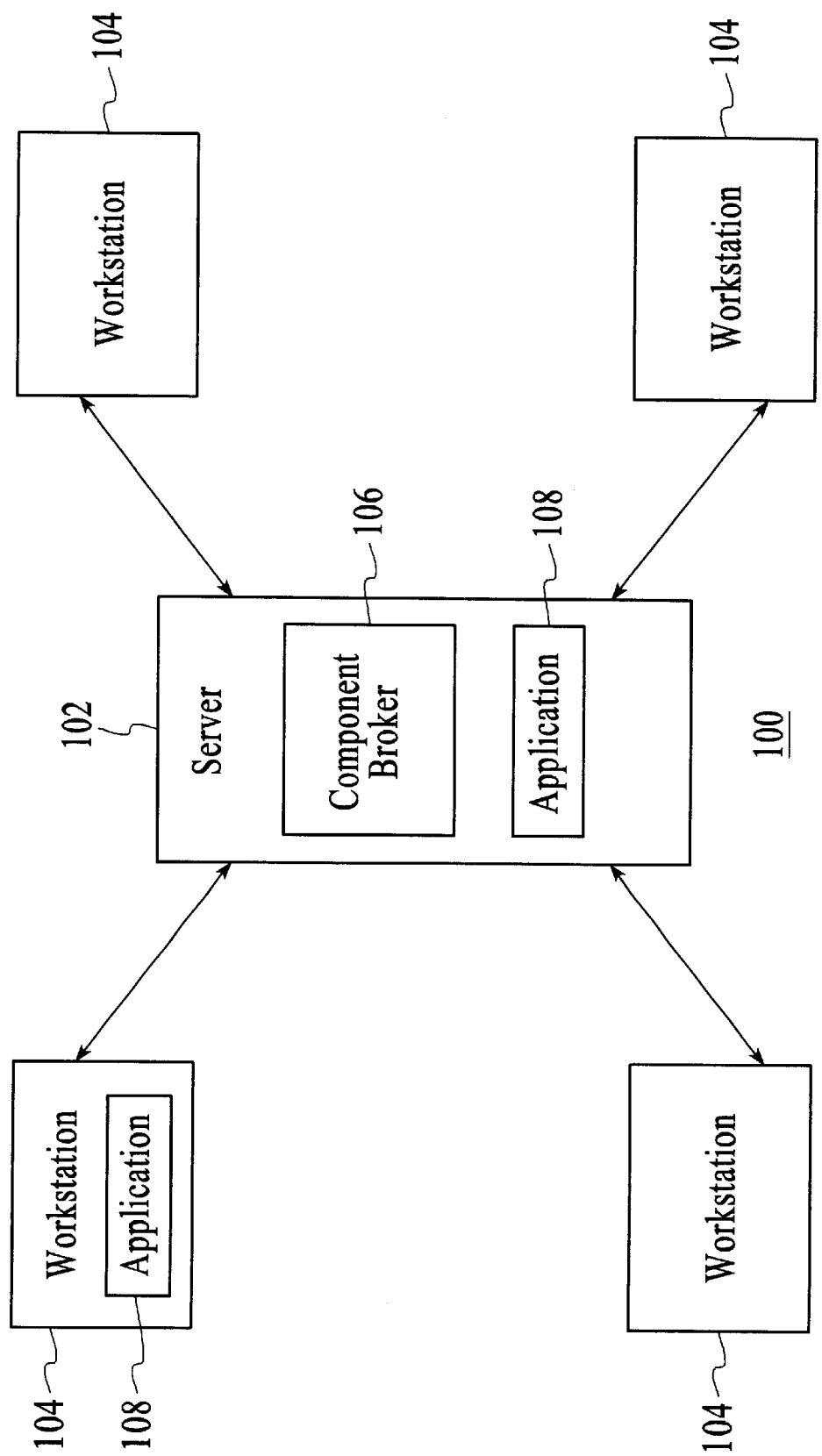
FIG. 1 illustrates a conventional computer network which may offer the Notification Service of Component Broker.
Figure 2:
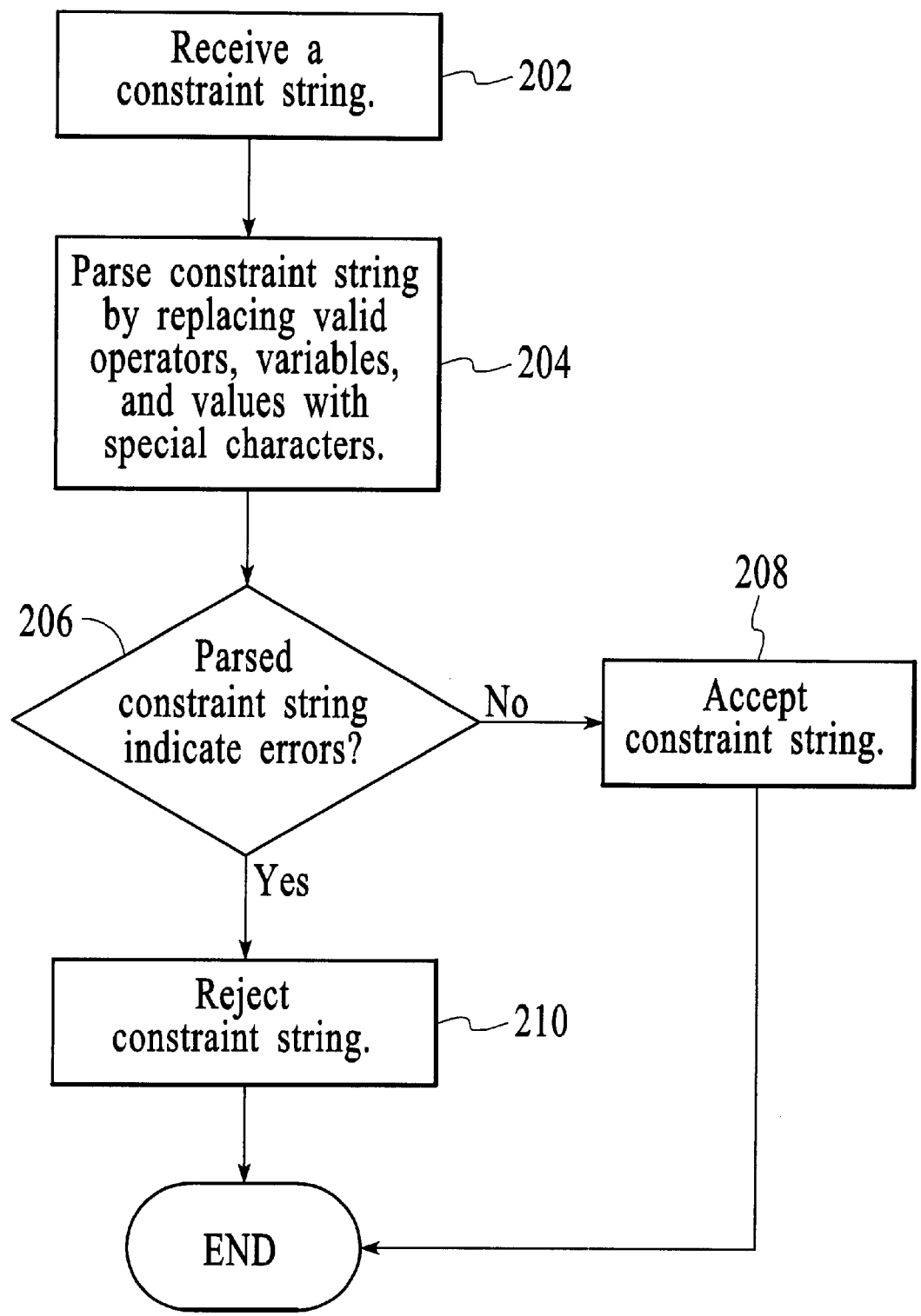
FIG. 2 is a flow chart illustrating a preferred embodiment of a parser for a constraint language in accordance with the present invention.

FIG. 2 is a flow chart illustrating a preferred embodiment of a parser for a constraint language in accordance with the present invention. First, a constraint string is received by the parser, via step 202. Next, the constraint string is parsed by replacing valid operators, variables and values with special characters, via step 204. Then it is determined if the parsed constraint string indicates the existence of errors in the constraint string, via step 206. If it does not, then the constraint string is accepted, via step 208. If it does, then the constraint string is rejected as containing invalid constraints, via step 210. In this manner, the parser of the present invention is able to detect all valid constraints. The parsing may be performed when the Component Broker first receives it, i.e., during run time. Thus, the parser of the present invention avoids the above problems of the conventional methods of error checking.

Figure 3:
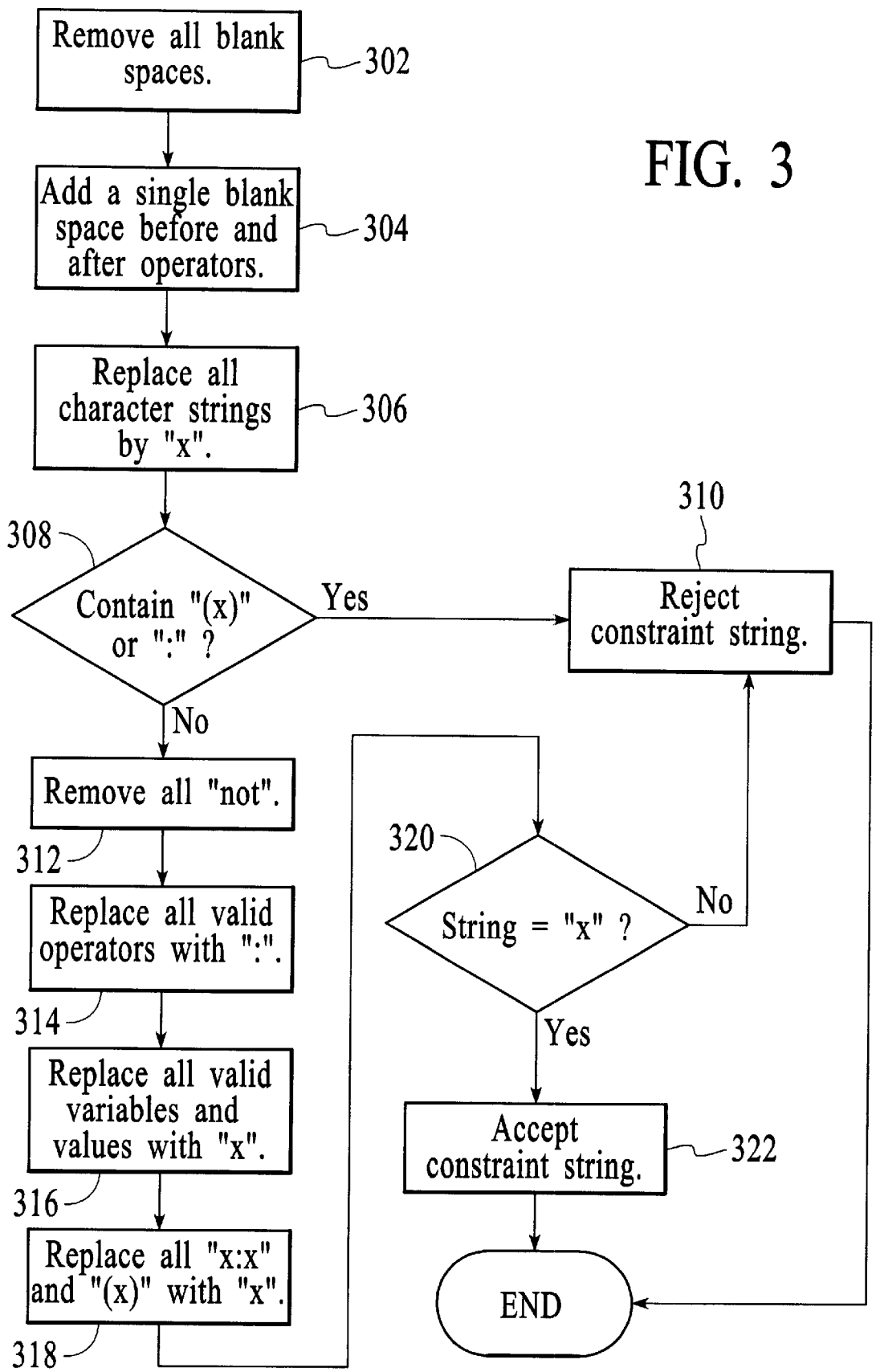
FIG. 3 is a flow chart illustrating in more detail the preferred embodiment of a parser for a constraint language in accordance with the present invention.

FIG. 3 is a flow chart illustrating in more detail the preferred embodiment of a parser in accordance with the present invention. Assume that the special character replacing valid variables and values is "x", and the special character replacing valid operators is a colon ":". First, the parser removes all of the blank spaces in the constraint string, via step 302. Then it adds a single blank space before and after all operators, via step 304. Steps 302 and 304 ensures that only one blank space exists before and after each operator. Next, the parser replaces all of the character strings by "x", via step 306, creating an intermediate constraint string. In the constraint language of Component Broker, strings are surrounded by single quotes. At this point, the parser checks if "(x)" or ":" exists in the intermediate constraint string, via step 308. The constraint string is checked for ":" at this point because no replacement of operators have yet been performed. Thus, if ":" appears in the intermediate constraint string, it is there through error. If "(x)" appears at this point, then a character string is used in an erroneous way since it is without operators or variables, rendering the expression meaningless. If either of these conditions exist, then the constraint string is rejected as containing invalid constraints, via step 310. If not, then the parser next removes all "not" operators, via step 312. Then all of the valid operators are replaced by via step 314. Next, all valid variables and values are replaced by "x", via step 316. The parser now proceeds to replace all "x:x" and "(x)" combinations with "x", via step 318. Step 318 is repeated until not no more "x:x" or "(x)" combinations remain. Once step 318 is finished, the parser checks the resulting constraint string to see if it has been reduced to a single "x", via step 320. If not, then the constraint string is rejected for containing invalid constraints, via step 310. If so, then the constraint string is accepted, via step 322.

Below are four examples of the parsing of a constraint string in accordance with the present invention. For Example 1, assume the constraint string entered by the user is ($a+1>32) OR ($b==5) OR ($c>3) OR NOT ($d=='abc').

"$a", "$b", "$c", and "$d" are valid variables. "+", ">", "==", and "OR" are valid operators. First, the parser removes all of the blank spaces in the constraint string, via step 302:

($a+1>32) OR ($b==5) OR ($c>3) OR NOT ($d=='abc').

Next, a single blank space is added to the constraint string before and after each operator, via step 304:

($a+1>32) OR ($b==5) OR ($c>3) OR NOT ($d=='abc').

Steps 302 and 304 ensured that only a single blank space exists before and after each operator, which eliminated the extra blanks in front of the first "OR" operator. Next, all of the strings are replaced by "x", via step 306, creating an intermediate constraint string, i.e., a constraint string which is partially parsed:

($a+1>32) OR ($b==5) OR ($c>3) OR NOT ($d==x).

At this point, the parser checks this intermediate constraint string for "(x)" or ":", via step 308. Since neither exists in the intermediate constraint string, the constraint string is not rejected at this point. The parser next removes all "not" operators, via step 312:

($a+1>32) OR ($b==5) OR ($c>3) OR ($d==x).

All valid operators are replaced with ":", via step 314:

($a:1:32):($b:5):($c:3):($d:x).

All valid variables and values are replaced with "x", via step 316:

(x:x:x):(x:x):(x:x):(x:x).

Then, all "x:x" and "(x)" are replaced with "x", via step 318:

(x:x):(x):(x):(x).

Step 318 is repeated until no other "x:x" or "(x)" remains:

(x):x:x:x x:x:x x:x x.

The parser next checks the resulting constraint string to determine if it has been reduced to a single "x", via step 320. Since it has, the constraint string entered by the user contains no errors and is accepted, via step 322.

For Example 2, assume the constraint string entered by the user is ($+1)>32) OR ($b==5) OR ($c>3) OR NOT ($d=='abc').

The constraint string here is the same as the constraint string in Example 1 except it contains a syntax error of a closed parenthesis after "32" which has no matching open parenthesis. First, the parser removes all of the blank spaces in the constraint string, via step 302:

($a+1)>32) OR ($b==5) OR ($c>3) OR NOT ($d=='abc').

Next, a single blank space is added to the constraint string before and after each operator, via step 304:

($a+1)>32) OR ($b==5) OR ($c>3) OR NOT ($d== 'abc').

Next, all of the character strings are replaced by "x", via step 306, creating an intermediate constraint string:

($a+1)>32) OR ($b==5) OR ($c>3) OR NOT ($d==x).

At this point, the parser checks this intermediate constraint string for "(x)" or ":", via step 308. Since neither exists in the intermediate constraint string, the constraint string is not rejected at this point. The parser next removes all "not" operators:

($a+1)>32) OR ($b==5) OR ($c>3) OR ($d==x).

All valid operators are replaced with ":", via step 314:

($a:1):32):($b:5):($c:3):($d:x).

All valid variables and values are replaced with "x", via step 316:

(x:x):x):(x:x):(x:x):(x:x).

Then, all "x:x" and "(x)" are replaced with "x", via step 318:

(x):x):(x):(x):(x).

Step 318 is repeated until no other "x:x" or "(x)" remains:

x:x):x:x:x x:x):x:x x:x):x.

The parser next checks the resulting constraint string to determine if it has been reduced to a single "x", via step 320. Since it has not, the constraint string entered by the user contains invalid constraints and is rejected, via step 310.

For Example 3, assume the constraint string entered by the user is ($a++1>32) OR ($b==5) OR ($c>3) OR NOT ($d== 'abc').

The constraint string contains a syntax error of "++" which is not a valid operator. First, the parser removes all of the blank spaces in the constraint string, via step 302:

($a++1>32) OR ($b==5) OR ($c>3) OR NOT ($d== 'abc').

Next, a single blank space is added to the constraint string before and after each operator, via step 304:

($a++1>32) OR ($b==5) OR ($c>3) OR NOT ($d== 'abc').

Next, all of the character strings are replaced by "x", via step 306:

($a++1>32) OR ($b==5) OR ($c>3) OR NOT ($d==x).

At this point, the parser checks this intermediate constraint string for "(x)" or ":", via step 308. Since neither exists in the intermediate constraint string, the constraint string is not rejected at this point. The parser next removes all "not" operators:

($a++1>32) OR ($b==5) OR ($c>3) OR ($d==x).

All valid operators are replaced with ":", via step 314:

($a++1:32):($b:5):($c:3):($d:x).

All valid variables and values are replaced with "x", via step 316:

(x++x:x):(x:x):(x:x):(x:x).

Then, all "x:x" and "(x)" are replaced with "x", via step 318:

(x++x):(x):(x):(x).

Step 318 is repeated until no other "x:x" or "(x)" remains:

(x++x):x:x:x (x++x):x:x (x++x):x.

The parser next checks the resulting constraint string to determine if it has been reduced to a single "x", via step 320. Since it has not, the constraint string entered by the user contains invalid constraints and is rejected, via step 310.

For Example 4, assume the constraint string entered by the user is ($a+1>32) OR ($b==5) OR ($c>3) OR NOT ('abc').

The constraint string contains a syntax error of the string "abc" without any operators or variables. First, the parser removes all of the blank spaces in the constraint string, via step 302:

($a+1>32) OR ($b==5) OR ($c>3) OR NOT ('abc').

Next, a single blank space is added to the constraint string before and after each operator, via step 304:

($a+1>32) OR ($b==5) OR ($c>3) OR NOT ('abc').

Next, all of the strings are replaced by "x", via step 306, creating an intermediate constraint string:

($a+1)>32) OR ($b==5) OR ($c>3) OR NOT (x).

At this point, the parser checks this intermediate constraint string for "(x)" or ":", via step 308. Since "(x)" exists in the intermediate constraint string, the constraint string is rejected at this point, via step 310, and the analysis ends.

A method and system for providing a parser for a constraint language in a computer network has been disclosed. The parser of the present invention is based upon an analysis of the constraint language from which patterns of the language are identified. The easily implemented parser of the present invention is developed based on these patterns. Because the method of the present invention replaces members of a finite set of valid operators, variables, and values, instead of attempting to identify an infinite number of possible errors, it is able to detect all invalid constraints.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a parser for a constraint language in a computer network, comprising the steps of:

(a) receiving a constraint string;

(b) removing all blank spaces from the constraint string;

(c) placing a single blank space before and after each operator;

(d) replacing all character strings in the constraint string with an "x", creating an intermediate constraint string;

(e) determining if the intermediate constraint string contains the "x" or a ":";

(f) continuing with step (g) if the constraint string does not contain the "x" or ":";

(g) removing all "not" operators, replacing all valid operators with the":", and replacing all valid variables and values with the "x";

(h) replacing all "x:x" with the "x", and replacing all "(x)" with the "x"; and (i) repeating step (h) until no "x:x" or "(x)" remain;

(j) determining if the parsed constraint string consists of a single "x"; and (k) accepting the constraint string if the parsed constraint string consists of a single "x", otherwise reject the constraint string.

2. A system for providing a parser for a constraint language in a computer network, comprising:
   a plurality of workstations;
   a server coupled to each of the plurality of workstations, the server comprising
      means for receiving a constraint string;
      means for removing all blank spaces from the constraint string;
      means for placing a single blank space before and after each operator;
      means for replacing all character strings in the constraint string with an "x", creating an intermediate constraint string;
      means for determining if the intermediate constraint string contains the "x" or a ":";
      means for rejecting the constraint string if the intermediate constraint string contains the "x" or ":";
      means for removing all "not" operators, replacing all valid operators with the ":", and replacing all valid variables and values with the "x";
      means for repeatedly replacing all "x:x" with the "x", and replacing all "(x)" with the "x" until no "x:x" or "(x)" remain;
      means for determining if the parsed constraint string consists of a single "x"; and
      means for accepting the constraint string if the parsed constraint string consists of a single "x", otherwise reject the constraint string.

\* \* \* \* \*